UNITED STATES PATENT OFFICE.

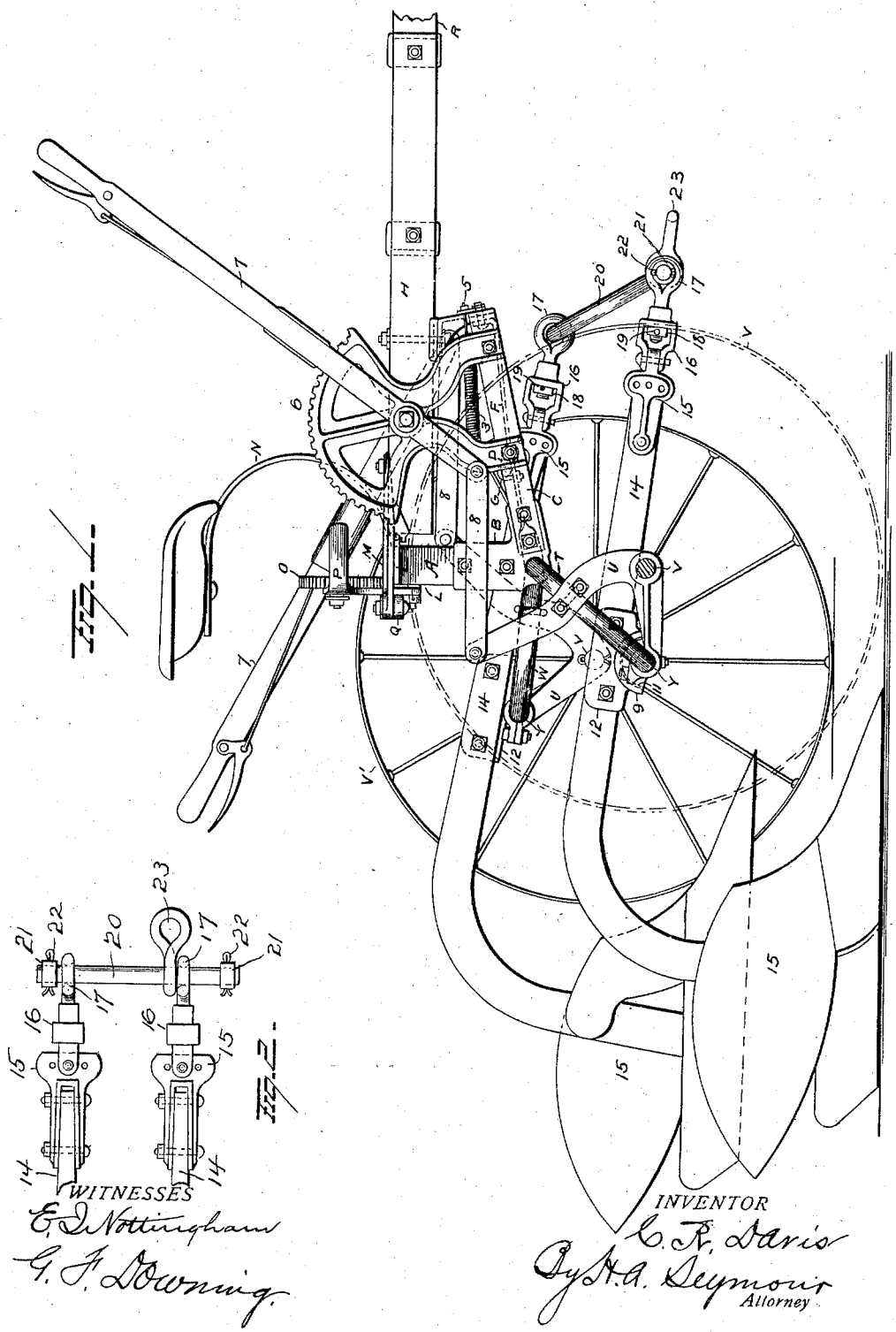

CALVIN R. DAVIS, OF SOUTH BEND, INDIANA, ASSIGNOR TO OLIVER CHILLED PLOW WORKS, OF SOUTH BEND, INDIANA.

SULKY-PLOW.

967,110.  Specification of Letters Patent.  Patented Aug. 9, 1910.

Application filed February 8, 1907. Serial No. 356,437.

*To all whom it may concern:*

Be it known that I, CALVIN R. DAVIS, a resident of South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

My invention relates to improvements in sulky plows, the object of the invention being to provide an improved sliding hitch for two ways or reversible sulky plows which will always move to a position to compel a line pull on the plow in use.

With this object in view, the invention consists in certain novel features of construction and combinations and arrangements of parts as will be more fully hereinafter described and pointed out in the claims.

In the accompanying drawings, Figure 1 is a perspective view illustrating my improvements. Fig. 2 is a detail top plan view showing the draft devices.

A represents a steel arch uniting the several parts of the plow, and comprises a steel I-beam with both ends bent down and secured to hangers B. Lugs are formed on the front of the hangers, which extend forward and form bearings to which the frame bar C is attached by bolts.

A stub pole H is located at one side of the center of the plow frame and connected with the main pole R by means of brackets S. The plow frame is supported on the wheels $V^1$, mounted on stubs V, and the latter connected with the plow frame by independent bails T, T, and brackets U, U. Two independent sectors 6 and lifting levers 7 are mounted on the respective sides of plow frame C, near the front thereof and said levers 7 are connected to the brackets U by links 8, as above explained. The plow beams 14 carrying plows 15 are attached, one to each of the wrists Y of the bails T. By means of the lifting levers 7 assisted by the lifting springs 3, the plow bottoms 15 can be elevated with but slight effort on the part of the operator and by means of the lifting levers the plows can be made to run at any depth required. The plow can be adjusted by means of the hand lifting levers to run level on uneven ground.

On the forward ends of both plow beams 14, clevises 15 are secured and have shackles 16 attached thereto by bolts as shown. The shackles 16 are provided with eye bolts 17 free to turn in the shackles and adjusted by nuts 18 having locking pins 19. A draft rod 20 is supported loosely in the eyes of the eye bolts and is provided at its ends with collars 21 and locking pins 22 to prevent escape of the draft rod from the eye bolts. A twisted draft link 23 is mounted on the draft rod between the eye bolts on the beams and a double tree clevis (not shown) is connected to the draft link. Said draft link is free to slide on the draft rod to contact with either of the eye bolts in the shackles and the operation is as follows:—It will be noted that the beam of the working plow projects in front of and lower than the idle or elevated plow beam. It will thus be seen that when one plow is elevated, the draft rod will be disposed at an incline and the eye bolts will turn to compensate for this movement and when draft is applied to the draft link, no matter where the latter may be, it will immediately move along the draft rod to the beam of the working plow and exert a direct pull thereon. When the working plow is elevated and the idle plow lowered the draft link will move along the draft rod to the other plow and hence without any manipulation on the part of the operator, direct draft will always be had on the working plow.

This construction affords a positive sliding hitch in which the shackles and eye bolts will take position conforming to the different angles of the draft rod in shallow or deep plowing.

Having fully described my invention what I claim as new and desire to secure by Letters-Patent, is:—

1. In a sulky plow, the combination with a wheeled frame, of two plows movably supported by the frame, means constructed to raise either of said plows and its beam bodily from end to end independent of the other, eye bolts having swivel connection with the forward ends of the plow beams, a draft rod loosely supported in the swiveled eye bolts, and a draft link slidably mounted on the draft rod.

2. In a sulky plow, the combination with a wheeled frame, of two plows movably supported by the frame, means constructed to elevate and move rearwardly either of said plows and its beam bodily from end to end independent of the other, eye bolts having swiveled connection with the forward ends of the plow beams, a draft rod loosely and slidably supported in the eyes of said eye bolts, retaining means on the end portions of the draft rod, and a draft link slidably mounted on the draft rod and adapted to move from one eye bolt to the other.

In testimony whereof, I have signed this specification in the presence of two subscribing witnesses.

CALVIN R. DAVIS.

Witnesses:
 EDWIN NICAR,
 H. R. BEALE.